Patented Dec. 10, 1940

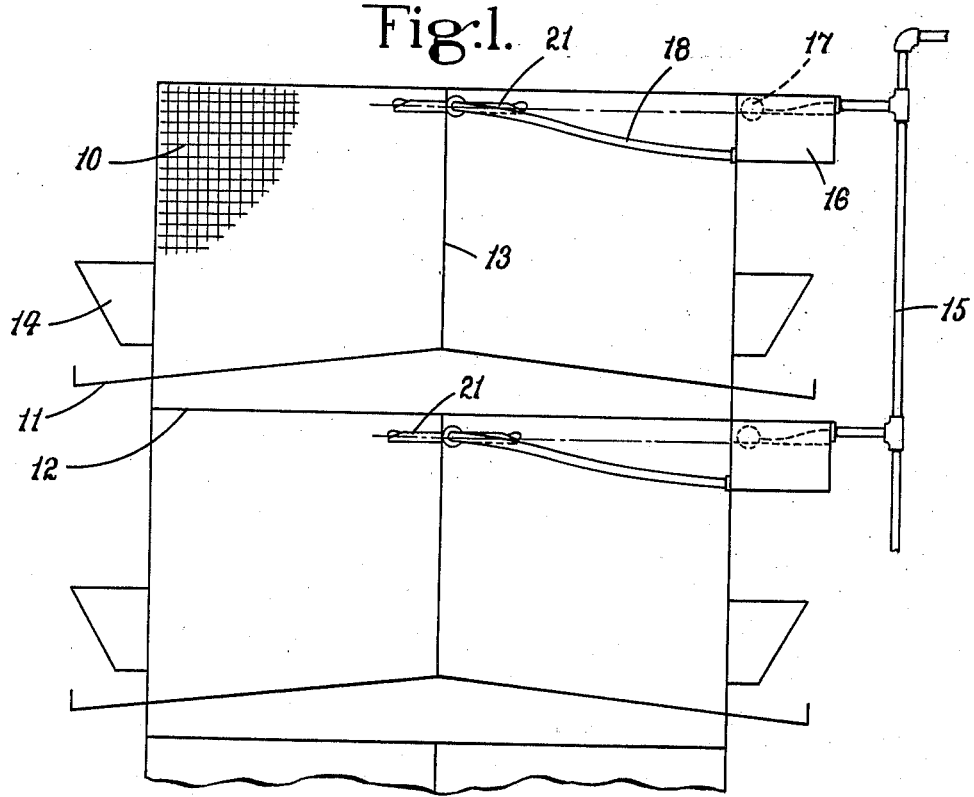
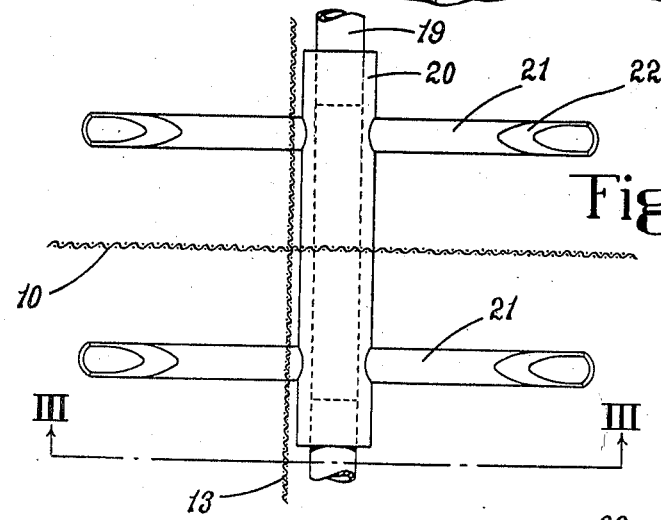
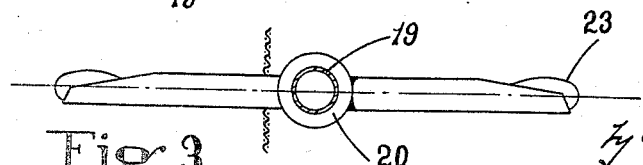

2,224,211

UNITED STATES PATENT OFFICE 2,224,211

POULTRY DRINKING FOUNTAIN

John J. Austin, Beverly, Mass.

Application May 22, 1939, Serial No. 274,960

5 Claims. (Cl. 119—18)

This invention relates to drinking fountains for poultry and is particularly adapted for use in houses where separate cages are provided for the individual birds. The invention consists in a nozzle of novel construction associated with a constant level water tank, the nozzle being so constructed that a single large drop of water is made always accessible to a bird, and the system is so arranged that as soon as the bird takes one drop from the nozzle, another drop is immediately formed to replace it.

The chief object of my invention is to provide a drinking fountain for use in a poultry house, which will always make available a fresh supply of water and yet eliminate dripping and wastage of water. It is unsatisfactory to provide an open pan of water for poultry because the water soon becomes fouled and contaminated. Furthermore, a hen cannot well drink from an open pan without splashing water on herself and on her surroundings. The purpose of my invention is to provide a drinking fountain from which the water is drawn drop by drop as needed and in such a manner as to eliminate splashing or slopping either on the floor or on the bird herself.

The nozzle of my invention is well adapted for use in the most modern poultry houses under such conditions as to provide an individual nozzle for each pen so that each hen may have her own individual water supply. It is to be understood, however, that my improved fountain is equally efficient in poultry houses where the birds are not segregated but are kept in groups. Furthermore my invention may be employed for providing water for chicks as well as for grown birds.

The most important advantage resulting from the use of my invention resides in the fact that the birds and their surroundings are kept perfectly dry, thus protecting the health of the birds as well as maintaining the surroundings in better condition. Another advantage of my invention is that the only water used is that which is actually consumed by the birds, with the result that the expense of operating the system of my invention is at the absolute minimum.

Broadly speaking, my invention comprises a tank in which the level of water is maintained constant by means of a float operating a valve which connects the tank to a source of water supply. Pipes connect the tank to nozzles consisting of horizontal pipes of small diameter having their outer ends open but bevelled so that the surface area of water lying in the pipes of which the nozzles are formed is greater than it would be if the bevel were not formed. The nozzles are so disposed that their longitudinal axes lie approximately in the plane of the level of water in the supply tank. The result is that the surface tension on the water in the nozzles together with the capillary action of the nozzle passages causes the water to form in a large drop which stands in the beveled end of the nozzle, the surface tension being so strong that the drop does not fall from the nozzle. This phenomenon is well known in physics and the general rule may be stated as follows—when a liquid is contained in a vessel terminating in a narrow capillary opening a certain excess of pressure is required to make the liquid flow out. If this pressure remains constant, the meniscus has an invariable shape and the drop does not increase. But as the pressure increases the drop gradually expands like a small elastic bag, and when the drop is so large that its weight exceeds the vertical component of the surface tension, it contracts at its upper part and finally falls off. Furthermore, the weights of the drops formed in any capillary tube are, for the same liquid, proportional to the diameters of the orifice. In the beveled end nozzle of my invention the drop is supported from beneath and the surface friction increases with the result that a large drop is formed and maintained in accessible location.

These and other features of my invention will be more readily understood and appreciated from the following detailed description of a preferred embodiment thereof, selected for purposes of illustration and shown in the accompanying drawing, in which—

Fig. 1 is a view in end elevation of a battery of cages showing diagrammatically the arrangement of a fountain constructed according to my invention, Fig. 2 is a plan view of a section of a drinking fountain, and Fig. 3 is a view in elevation along the line III—III of Fig. 2.

As shown in the drawing the fountain of my invention may conveniently be associated with a battery of individual poultry pens having transverse side walls 10 of wire netting and arranged in superposed pairs. Each pair of pens is separated by a longitudinal wall 13 of wire netting and provided with an inclined bottom wall 11. Under each pair of pens is a solid floor 12 for receiving the droppings from the pens above. The pens are also provided with individual feeding troughs 14, and it will be understood that the description thus far relates to a conventional arrangement forming no part of my invention.

A water supply pipe 15 runs down one side of the battery of pens and is connected to tanks 16 secured to the sides of the adjacent pens. Each tank 16 is provided with a ball float 17 operating a valve in the pipe leading from the supply pipe 15 to the tank, thus providing for the maintenance of a constant water level in the tank 16. From the bottom of each tank 16 a pipe 18 leads upwardly to a pipe 19 which runs longitudinally along the battery of pens near the top thereof. Where four pens come together the pipe 19 is interrupted, and the hiatus is bridged by a sleeve 20 having holes for transverse capillary nozzle pieces 21. The ends of the nozzle pieces, which may be made of 3/8" pipe, are opened and beveled back on top as shown in Figs. 2 and 3 to form re-entrant recesses. The side walls of these recesses are formed by the walls of the nozzle 21 bevelled on a plane forming the oblique surface 22. Each recess has an end opening extending below the axis of the nozzle. The pipe 19, and consequently the nozzles 21, are so arranged that their longitudinal axes are approximately in the same plane as the level of water in the tank 16. The water therefore enters the nozzles 21 and is restrained by its surface tension at the ends of the nozzles and does not run from the nozzles 21 as might be expected, although the end opening of the nozzle extends substantially below the water level of the system. The combination of the action of the surface tension of the water and the capillary action of the nozzle passages causes a large drop 23 of water to form at the end of each nozzle 21. It will be apparent that a nozzle 21 is provided for each pen and that one tank 16 serves all the nozzles lying in the plane of the water level in it.

When a hen gobbles the drop 23 presented at the end of the nozzle 21, a new drop is immediately formed, the float 17 operating to restore the desired water level.

It will be understood that the diameter of the nozzle must be such that appreciable capillary action will be obtained. Furthermore all the joints must be air tight and the ends of the nozzles should be free from grease in order for surface tension of the water to perform its function.

There are two reasons why the nozzles must be beveled on top. One reason is that the phenomena due to surface tension are only exhibited when the liquid is in contact with air or gas, and the bevel enlarges the area where surface tension applies and results in the formation of drops of useful size. Furthermore the bevel presents a larger aperture to the hen so that the hen's beak can enter the nozzle 12 sufficiently to receive the drop 23.

It will be apparent from the foregoing description that the number of nozzles per tank is not limited and that the system of my invention may be employed not only in hen houses having batteries of individual pens but also in poultry houses where several or all the birds are kept in a group. Hens should be kept as dry as possible, and my invention makes this possible since it eliminates dripping as well as open water troughs or pans. At the same time it provides a system that may be utilized with an unexhaustable water supply such as a city service main.

Having thus described my invention what I claim as new and desire to secure by Letters Patent of the United States is—

1. A drinking fountain for birds which comprises a water tank, means for maintaining a constant water level in said tank, and a beveled-end nozzle connected to said tank and disposed with its longitudinal axis in substantially the same plane as the level of water in said tank and providing an end opening which extends below said level and is of such dimensions as to hold the water by surface tension against gravity.

2. A drinking fountain for birds which comprises a water tank, means for maintaining the level of water in said tank at a predetermined height, and a plurality of nozzles connected to said tank and disposed with their longitudinal axes in substantially the same plane as the level of water in said tank and each presenting an inclined surface in its wall exposing a channel extending to the end of the nozzle and having an end opening which extends below said level and which is of such dimensions as to hold the water by surface tension against gravity.

3. A drinking fountain for birds which comprises a water tank, means for maintaining the level of water in said tank at a predetermined height, and a plurality of nozzles having re-entrant recesses in their upper sides, connected to said tank, and disposed with their longitudinal axes in substantially the same plane as the level of water in said tank and having openings which extend partially below the water level of the system and are of such dimensions as to hold the water by surface tension against gravity.

4. A drinking system for hen houses having a battery of individual hen cages, which comprises a tank for water, means for maintaining the water in said tank at a constant predetermined level, a conduit connected to said tank and leading to said battery of cages, and a capillary nozzle located in each cage, connected to said conduit, and disposed with its longitudinal axis lying in substantially the same plane as the level of water in said tank, whereby drops of water will form at the ends of the nozzles and remain there without falling of their own weight.

5. A nozzle for a poultry drinking fountain comprising a horizontal tube terminating in a steeply inclined end surface and intersecting an inclined surface in the walls of the tube which makes an acute angle to the horizontal and exposes the passage of the tube for a substantial distance from its end, thus providing an open-end receptacle for a large drop of water.

JOHN J. AUSTIN.